US009333476B2

(12) United States Patent
Campanella et al.

(10) Patent No.: US 9,333,476 B2
(45) Date of Patent: May 10, 2016

(54) GRID NOZZLE ASSEMBLY, A FLUIDIZED BED REACTOR WITH A GRID NOZZLE ASSEMBLY AND METHODS OF USING A GRID NOZZLE ASSEMBLY

(71) Applicant: Amec Foster Wheeler North America Corp., Hampton, NJ (US)

(72) Inventors: Ron Campanella, Long Valley, NJ (US); Tanveer Khan, Clinton, NJ (US); Patrick Gargone, Easton, PA (US); Robert Musgrove, Pilot Mountain, NC (US)

(73) Assignee: AMEC FOSTER WHEELER NORTH AMERICA CORP., Hampton, NJ (US)

( * ) Notice: Subject to any disclaimer, the term of this patent is extended or adjusted under 35 U.S.C. 154(b) by 9 days.

(21) Appl. No.: 14/332,741

(22) Filed: Jul. 16, 2014

(65) Prior Publication Data
US 2016/0016136 A1    Jan. 21, 2016

(51) Int. Cl.
*B01J 8/18* (2006.01)
*B01J 8/24* (2006.01)
*F26B 3/08* (2006.01)
*B23K 20/00* (2006.01)
*B23K 31/02* (2006.01)
(Continued)

(52) U.S. Cl.
CPC .... *B01J 8/24* (2013.01); *B01J 8/44* (2013.01); *B23K 20/002* (2013.01); *B23K 31/02* (2013.01); *F23C 10/20* (2013.01); *F26B 3/082* (2013.01); *F27B 15/10* (2013.01)

(58) Field of Classification Search
CPC .............. B01J 8/18; B01J 8/1872; B01J 8/24; B01J 19/24; B23K 20/00; B23K 20/002; B23K 31/00; B23K 31/02; F26B 3/00; F26B 3/02; F26B 3/06; F26B 3/08; F26B 3/14
See application file for complete search history.

(56) References Cited

U.S. PATENT DOCUMENTS

| 1,773,944 A |   | 8/1930 | Brakeman |
| 2,445,083 A | * | 7/1948 | Reed ..................... B01D 3/205 |
|             |   |        | 261/114.2 |

(Continued)

FOREIGN PATENT DOCUMENTS

| CA | 1151474 A1 | 8/1983 |
| DE | 9003391 U1 | 7/1990 |

(Continued)

OTHER PUBLICATIONS

Notification of an International Search Report and Written Opinion mailed Sep. 23, 2015, in corresponding International Patent Application No. PCT/IB2015/054564.

*Primary Examiner* — Natasha Young
(74) *Attorney, Agent, or Firm* — Fitzpatrick, Cella, Harper & Scinto

(57) ABSTRACT

A grid nozzle assembly for a fluidized bed reactor that includes a horizontally extending bottom plate, a gas plenum chamber below the bottom plate, and vertical gas pipes having a top end and extending from the gas plenum chamber upwards across the bottom plate. The assembly includes a nozzle head with a gas channel that injects fluidizing gas from one of the vertical gas pipes to the reaction chamber. A tube sleeve is adapted to be fixed by welding around the top end of the vertical gas pipe. The nozzle head and the tube sleeve have a knob and groove portion that form a twist-lock enabling quick connecting and disconnecting of the nozzle head and the tube sleeve.

14 Claims, 4 Drawing Sheets

(51) Int. Cl.
  *B01J 8/44* (2006.01)
  *F23C 10/20* (2006.01)
  *F27B 15/10* (2006.01)
  *B01J 19/24* (2006.01)
  *F26B 3/02* (2006.01)
  *F26B 3/06* (2006.01)
  *F26B 3/14* (2006.01)

(56) References Cited

U.S. PATENT DOCUMENTS 3,708,887 A    1/1973  Erisman
4,429,471 A *  2/1984  Goodstine ............... F26B 3/082
                                                  239/557
4,715,996 A *  12/1987 Lambousy .......... B01F 3/04113
                                                  261/114.2
8,236,235 B2   8/2012  Miller et al.
2008/0265066 A1  10/2008  Miller et al.
2012/0315202 A1* 12/2012  Song et al. ............... B01J 8/005
                                                  422/311

FOREIGN PATENT DOCUMENTS

EP    2522903    A2    11/2012
WO    2010/011457 A2    1/2010

* cited by examiner

GRID NOZZLE ASSEMBLY, A FLUIDIZED BED REACTOR WITH A GRID NOZZLE ASSEMBLY AND METHODS OF USING A GRID NOZZLE ASSEMBLY

BACKGROUND OF THE INVENTION

1. Field of the Invention

The present invention relates to a grid nozzle assembly for a fluidized bed reactor, a fluidized bed reactor with a grid nozzle assembly, a method of mounting a grid nozzle assembly as a replacement in a fluidized bed reactor, and a method of replacing a grid nozzle assembly in a fluidized bed reactor.

2. Description of the Related Art

In fluidized bed reactors, such as circulating or bubbling fluidized bed boilers or gasifiers, chemical reactions are performed in a reaction chamber in a fluidized bed of particles, such as sand or ash or fuel particles. The bed is fluidized by bringing fluidizing gas, such as combustion air, to the reaction chamber from a gas plenum chamber, usually so-called a wind box, through a bottom grid of the reaction chamber. The bottom grid comprises grid nozzles through which the gas is injected in a predetermined, relatively high velocity and predetermined direction to the reaction chamber. The grid nozzles can also be used for removing solid particles from the bottom of the reaction chamber.

The conditions in the reaction chamber are often relatively harsh due to high temperatures, chemical attack of compounds formed in the reaction chamber, or erosion caused by bed particles entrained with the fluidizing gas. Due to the harsh conditions, there is often a need to regularly replace grid nozzles by new ones. The replacement has to be done during relatively short outage times of the fluidized bed reactor. Because there can be several thousands of grid nozzles in the bottom grid of a fluidized bed reactor, the easiness of the replacement of the grid nozzles is of great importance.

Commonly used grid nozzles of fluidized bed reactors are made of steel and comprise a vertical tube or gas pipe that is welded to a bottom plate of the reaction chamber and a head portion, so-called a nozzle head, through which the fluidizing gas is guided horizontally or slightly downwards to the fluidized bed reactor either as evenly distributed in all directions or directed in a certain direction. The bottom plate and a lower portion of the vertical tubes are usually covered by a protecting refractory layer. During the operation of the fluidized bed reactor, a portion of the vertical tubes may also be embedded in stagnant or slowly moving bed particles, whereas the head portions are directly exposed to the harsh conditions. Thus, the nozzle heads are especially prone to deterioration. Also, it is typical to fluidized bed reactors that some ash may enter in the fluidizing gas being supplied to the fluidized bed reactor. Due to the ash, there is a risk for high velocity ash erosion to occur inside the grid nozzles, increasing the need for frequent maintenance. Thus, there is a need for grid nozzles, the nozzle heads of which can be easily replaced.

In conventional grid nozzles, such as those shown in Canadian Patent No. 1151474, the vertical tube and the nozzle head are of one piece, or they are welded together so as to form a monolithic, integral piece. Thus, when there is a need to replace the nozzle head, it is common practice to cut the vertical tube and to weld a replacement part with a new nozzle head around the upper end of the remaining portion of the vertical tube. This is a relatively slow process, which tends to shorten each time the remaining tube. It also gives rise to a considerable amount of harmful metal debris, which has to be removed from the bottom grid.

U.S. Pat. No. 3,708,887 shows a grid nozzle in which the vertical tube comprises an external thread and a tubular member of a nozzle head comprises a corresponding internal thread so as to connect the nozzle head to the vertical tube. Such a threaded nozzle head coupling is not suitable for many large scale fluidized bed reactors, because the thread is relatively slow to open, and it may easily become stuck during the operation of the reactor.

International Patent Publication No. WO 2010/011457 A2 shows a grid nozzle, in which, around the upper end of a vertical tube, is welded a sleeve with an internal thread, and a lower portion of a tubular nozzle head comprises a corresponding external thread so as to connect the nozzle head to the sleeve. The connection of the tubular nozzle head to the sleeve is secured by tack welds between an outer rim of the nozzle head and the upper edge of the sleeve. This nozzle grid construction is also relatively slow to open and may deteriorate or become stuck during the operation.

An object of the present invention is to provide a new grid nozzle assembly that at least partially minimizes problems of the prior art described above.

SUMMARY OF THE INVENTION

According to one aspect, the present invention provides a grid nozzle assembly, suitable to be mounted in a reaction chamber of a fluidized bed reactor, comprising a horizontally extending bottom plate, a gas plenum chamber below the bottom plate, and vertical gas pipes having a top end and extending from the gas plenum chamber upwards across the bottom plate, wherein the grid nozzle assembly comprises a nozzle head with a gas channel for injecting fluidizing gas from one of the vertical gas pipes to the reaction chamber and a tube sleeve adapted to be firmly fixed by welding around the top end of the gas pipe, wherein the nozzle head and the tube sleeve form a twist-lock enabling quick connecting and disconnecting of the nozzle head and the tube sleeve.

The nozzle head advantageously comprises a horizontally extending top portion and a downwards extending stem adapted to completely fit into the tube sleeve, i.e., the stem fits into the tube sleeve so that the horizontally extending top portion makes a direct contact with an upper surface of the tube sleeve, to convey the fluidizing gas from the gas pipe to the gas channel of the nozzle head and to form the twist-lock with the tube sleeve.

According to a preferred embodiment of the present invention, the internal surface of the tube sleeve comprises at least one groove, comprising a vertical groove portion extending from an upper end of the tube sleeve to a central portion of the tube sleeve and a horizontally extending groove portion in connection with the lower end of the vertical groove portion and extending a predetermined angle from a lower end of the vertical portion. The predetermined angle is preferably from about ten degrees to about one hundred sixty degrees, even more preferably, from about twenty degrees to about ninety degrees, most preferably, about thirty degrees.

The outer surface of the stem correspondingly comprises at least one knob fitting in the at least one groove, so as to enable twist-locking the nozzle head with the tube sleeve by inserting the knob into the vertical groove portion, sliding the stem downwards in the tube sleeve so far that the knob reaches the lower end of the vertical groove portion, and twisting the nozzle head so as to move the knob in the horizontal groove portion. Usually, the internal surface of the tube sleeve comprises two grooves, as described above, arranged opposite to each other, and the outer surface of the stem correspondingly comprises two knobs fitting in the grooves, but the number of grooves and knobs can be one or even more than two.

As mentioned above, the stem is advantageously adapted to completely fit into the tube sleeve, i.e., when the nozzle head is seated in its mounting position in connection with the tube sleeve, the top portion of the nozzle head, or, more precisely, a horizontally extending lower surface of the top portion, is in contact with the upper surface of the tube sleeve. Thereby, the arrangement enables efficient securing of the twist lock, i.e., preventing accidental twisting of the nozzle head, by a tack weld, or tack welds, formed between the lower surface of the top portion and an outer surface of the tube sleeve. By arranging the tack weld or tack welds below the lower surface of the top portion, the top portion effectively protects the tack welds from the moving fluidized bed particles and, thus, minimizes erosion caused by the bed particles.

Each of the horizontally extending groove portions is advantageously slightly slanted from the vertical groove portion downwards, so as to enable efficient tightening of the lower surface of the top portion of the grid nozzle towards the upper surface of the tube sleeve. By having the top portion tightened towards the tube sleeve, the tack welding is made easier. Even more importantly, a tight contact between the top portion and the tube sleeve efficiently prevents migration and sticking of fine bed particles between the tube sleeve and the nozzle head, without having to weld around the whole seam between the nozzle head and the tube sleeve. Thereby, the present mounting system enables a quick and an efficient way of minimizing the risk of damaging of the internal surface of the tube sleeve and/or unreplaceable sticking of the nozzle head to the tube sleeve.

In order to avoid turbulence in the gas flow within the grid nozzles, and internal erosion caused by particles entrained with the gas flow, the diameter of the gas flow path is preferably constant throughout the vertical gas pipe and the vertical portion of the gas channel. Therefore, the diameter of the bore of the stem preferably corresponds to that of the vertical gas pipes. Correspondingly, in order to avoid any discontinuity in the gas flow path at the joint of the nozzle head and the vertical gas pipe, the length of the stem is advantageously adapted so that the stem substantially tightens with the vertical gas pipe when the lower surface of the top portion of the nozzle head is tightened to the upper surface of the tube sleeve.

When grid nozzles according to the present invention are mounted in a fluidized bed reactor, the tube sleeves are firmly fixed to the vertical gas pipes, preferably, by welding. According to a preferred embodiment, each of the tube sleeves comprises at least one opening, preferably, two oppositely arranged openings, to allow fixing the tube sleeves to the gas pipes by plug-welding. Another possibility is to contour the lower edge of the tube sleeves so as to form areas for fillet welds. When there is sufficient space from the tube sleeves to the bottom plate, or to a refractory layer on the bottom plate, it is also possible to fix the tube sleeves to the vertical gas pipes by using full circumferential welds.

According to an aspect, the present invention provides a fluidized bed reactor comprising a horizontally extending bottom plate, a gas plenum chamber below the bottom plate, multiple vertical gas pipes having a top end extending from the gas plenum chamber upwards across the bottom plate multiple, and multiple grid nozzle assemblies according to any of the embodiments described above, wherein the tube sleeves of the grid nozzle assemblies are firmly fixed around the top ends of the vertical gas pipes by welding, for example, by plug-welding, fillet welding, or full circumferential welding.

According to a further aspect, the present invention provides a method of mounting a grid nozzle assembly, as a replacement in a fluidized bed reactor, comprising a horizontally extending bottom plate, a gas plenum chamber below the bottom plate, and multiple vertical gas pipes having a top end and extending from the gas plenum chamber upwards across the bottom plate, wherein the method comprises the steps of mounting a grid nozzle, in accordance with any of the embodiments described above, in the fluidized bed reactor, by firmly fixing the tube sleeve by welding, for example, by plug-welding, fillet welding, or full circumferential welding, around the top end of one of the gas pipes.

It is possible to first fix the tube sleeve firmly to the top of the gas pipe and, only after that, to perform the easily removable tack-welding of the nozzle head to the tube sleeve. According to another possibility, the nozzle head is first tack-welded to the tube sleeve and, only after that, the tube sleeve is firmly fixed to the top of the gas pipe. An advantage of the latter possibility is that the tack-welding can be performed in desired conditions and only the firm fixing is performed in more demanding conditions, in the reaction chamber. Thus, according to an aspect, the present invention also provides a grid nozzle assembly comprising a nozzle head and a tube sleeve, according to any of the embodiments described above, which nozzle head is removably tack welded to the tube sleeve so as to allow quick disconnecting the nozzle head and the tube sleeve.

According to a still further aspect, the present invention provides a method of replacing the nozzle head of a grid nozzle assembly according to any of the above-described embodiments of the present invention, and comprising a nozzle head that is tack-welded in a tube sleeve, by disconnecting and connecting a twist-lock between the nozzle head and the tube sleeve. Thus, the method comprises removing the tack weld or tack welds from between the nozzle head and the tube sleeve, twisting the nozzle head while keeping the tube sleeve in place and sliding the nozzle head upwards so as to remove the nozzle from the tube sleeve, sliding a new nozzle head downwards in the tube sleeve, twisting the new nozzle head in the tube sleeve, and securing the new nozzle head to the tube sleeve by forming a new tack weld.

Because the twist-lock of a used grid nozzle to be replaced may be fairly tight, the outer surface of the tube sleeve advantageously comprises flat surfaces, such as two opposite to each other arranged flat surfaces, to enable firmly holding the tube sleeve while twisting the nozzle head. Thereby, it is possible to exert relatively high torsional momentum to the nozzle head without risk of damaging the gas pipe.

The above brief description, as well as further objects, features, and advantages of the present invention will be more fully appreciated by reference to the following detailed description of the currently preferred, but nonetheless, illustrative, embodiments in accordance with the present invention, when taken in conjunction with the accompanying drawings.

DETAILED DESCRIPTION OF THE INVENTION

Figure 1:
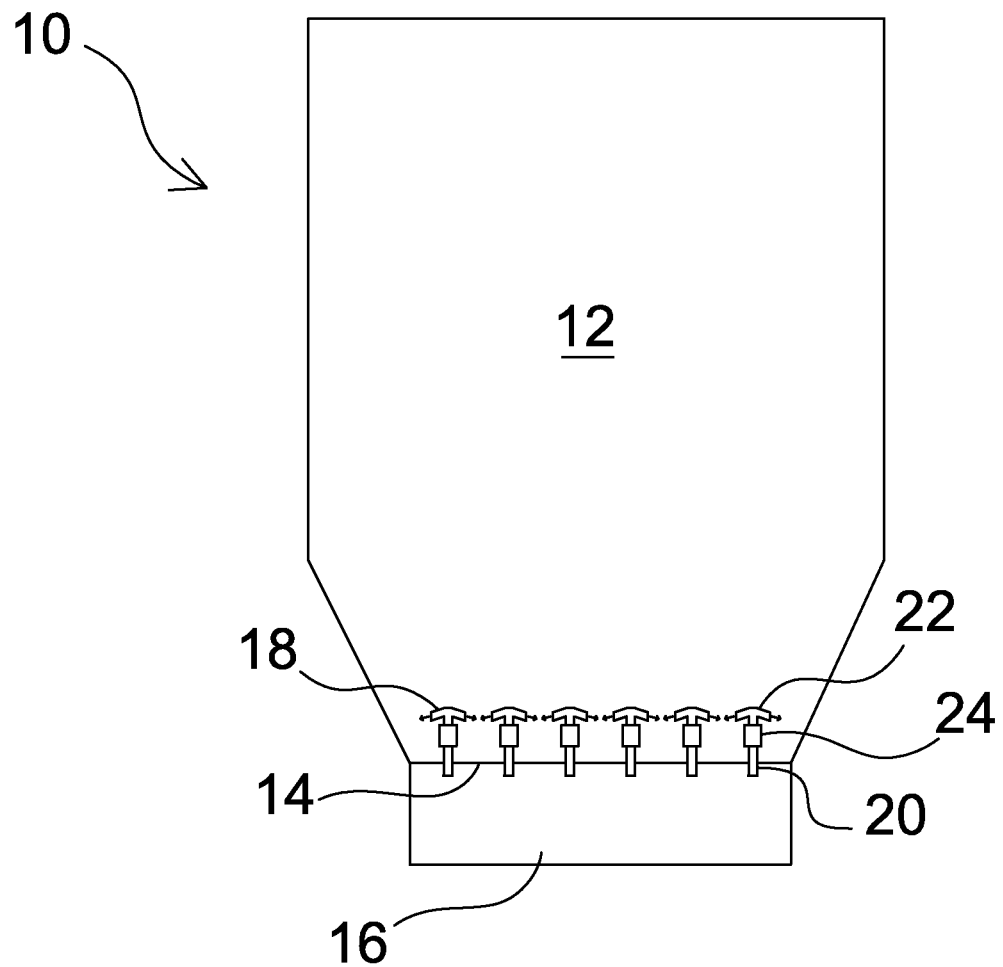
FIG. 1 shows a schematic view of a fluidized bed reactor with grid nozzles.

The schematic diagram of FIG. 1 shows a fluidized bed reactor 10 having a reaction chamber 12. The reaction chamber comprises a horizontally extending bottom plate 14 and a gas plenum chamber 16, a so-called wind box, below the bottom plate. In the fluidized bed reactor 10, which can be, for example, a circulating or bubbling fluidized bed boiler or gasifier, chemical reactions are performed in the reaction chamber 12 in a fluidized bed of particles, such as sand or ash or fuel particles. The bed is fluidized by bringing fluidizing gas, such as combustion air, to the reaction chamber 12 from the wind box 16 through a bottom grid of the reaction chamber 12. The bottom grid comprises multiple grid nozzles 18 through which the fluidizing gas is injected in a predetermined, relatively high velocity and predetermined direction to the reaction chamber 12. In practice, a fluidized bed reactor 10 also comprises many other parts, such as fuel feeding nozzles, an exhaust gas channel, etc. Because such parts are not relevant for the present invention, however, they are omitted from FIG. 1.

The grid nozzles 18 are formed of vertical gas pipes 20 extending from the wind box 16 upwards across the bottom plate 14, and nozzle heads 22 comprising a gas channel for injecting fluidizing gas from a gas pipe 20 to the reaction chamber 12. The nozzle heads 22 are attached to the gas pipes 20 by the use of tube sleeves 24. According to the present invention, the tube sleeves 24 are firmly fixed by welding around the top ends of the gas pipes 20, but the nozzle heads 22 are connected to the tube sleeves 24 by a twist-lock, enabling quick connecting and disconnecting of the nozzle head 22 and the tube sleeve 24, as will be described more in detail in conjunction with the schematic diagrams of FIGS. 2 to 4a and 4b. The same or corresponding elements are indicated in the different drawings by the same reference numbers.

Figure 2:
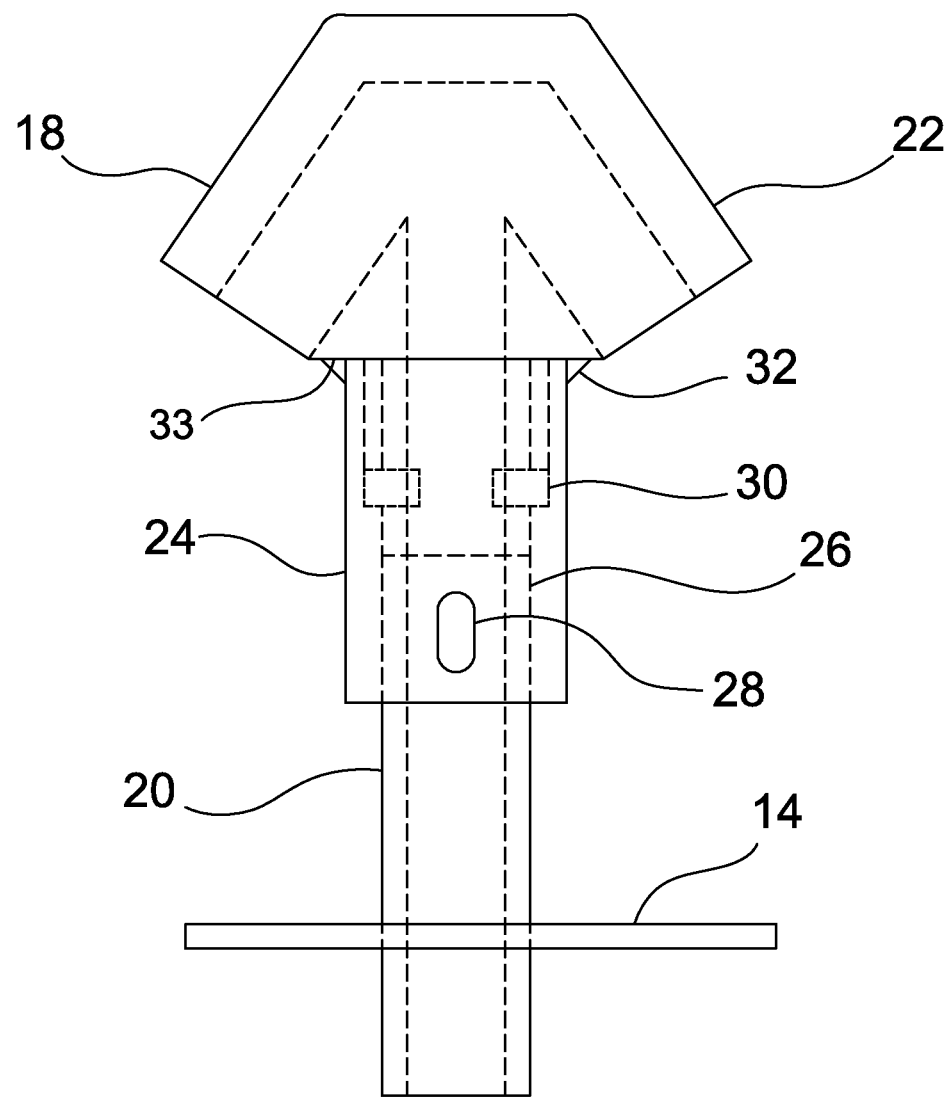
FIG. 2 shows a schematic side view of a grid nozzle according to an embodiment of the present invention.

FIG. 2 schematically shows a side view of a grid nozzle 18 in accordance with an embodiment of the present invention, connected to a bottom plate 14 of a fluidized bed reactor 10. FIG. 2 shows a conventional gas pipe 20, which is attached to the bottom plate 14 by any conventional means, usually by welding, not shown in FIG. 2. A tube sleeve 24 is firmly fixed in an upper end 26 of the gas pipe 20 by a plug-weld 28. Usually, there are two plug-welds 28 on opposite sides of the tube sleeve 24. It is alternatively possible to fix the tube sleeve 24 to the vertical gas pipe by another type of welding, such as fillet welding or full circumferential welding. A nozzle head 22 is connected to the tube sleeve 24 by a twist-lock 30, to be explained below, which is secured by tack welds 32. The tack welds 32 are advantageously arranged below a horizontally extending lower surface 33 of the top portion of the nozzle grid 22, to protect the tack welds from erosion caused by moving bed particles.

Figure 3:
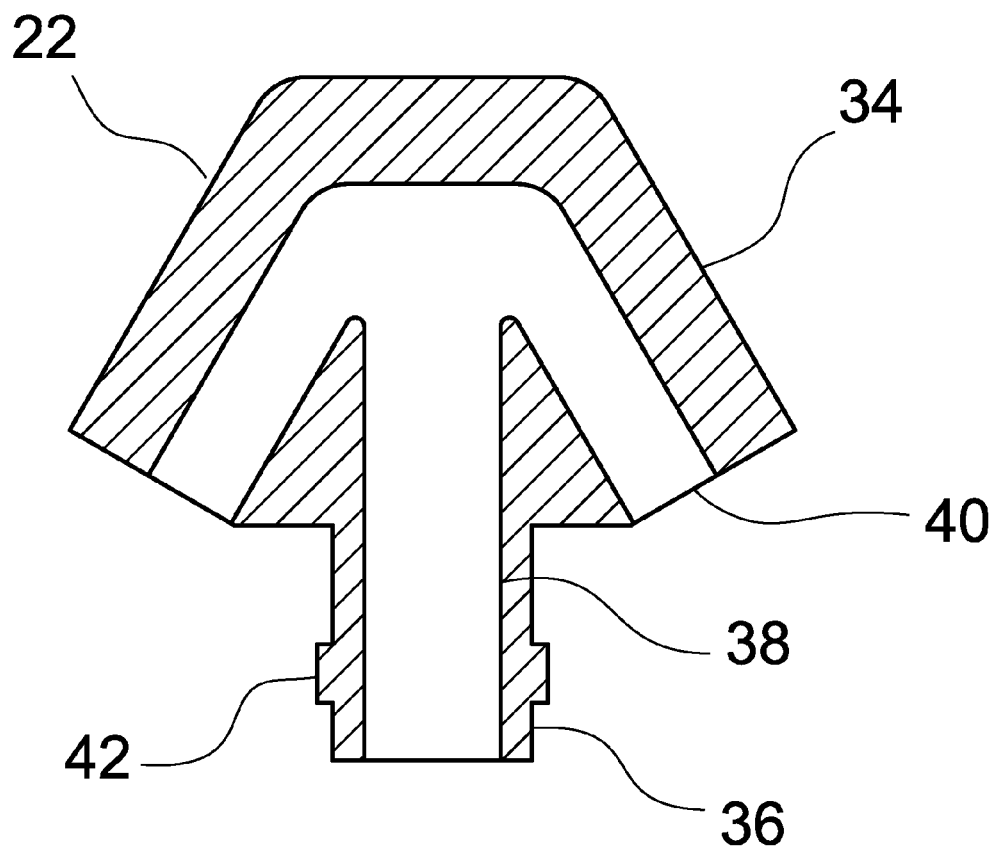
FIG. 3 shows a schematic cross-sectional view of a nozzle head of a grid nozzle assembly according to an embodiment of the present invention.

FIG. 3 depicts a cross-sectional view of a nozzle head 22 according to an embodiment of the present invention. The nozzle head 22 comprises a horizontally extending top portion 34 and a downwards extending stem 36. A gas channel 38 extends from the lower end of the stem 36 to outlets branches 40 extending to lateral ends of the top portion 34. The outlet branches shown in FIG. 3 are slanted downwards to inject fluidizing gas towards the bottom plate 14, but the outlet branches may alternatively be directed differently, for example, horizontally. The top portion 34 comprises two outlet branches 40, but the nozzle head 22 may alternatively comprise only one outlet branch, to inject the fluidizing gas in a certain direction, for example, to move solid particles on the bottom plate in a certain direction. It is also possible that the nozzle head 22 comprises more than two outlet branches 40 to distribute the fluidizing gas evenly to the reaction chamber 12.

The stem 36 is adapted to fit into a tube sleeve 24, to be connected to a vertical gas pipe 20 connected to the bottom plate 14 of a fluidized bed reactor 10. Thus, the stem 36 is a mainly hollow cylinder having a bore diameter that corresponds to the bore diameter of the gas pipes 20. In order to form a twist-lock with the tube sleeve 24, the stem 36 comprises two knobs 42 on opposite sides of the outer surface of the stem 36. Alternatively, there may be only one knob 42, or there may be more than two knobs 42. The purpose and function of the knobs 42 and their relation to corresponding grooves in the inner surface of the tube sleeve 24 will be explained below in conjunction with FIGS. 4a and 4b.

Figure 4A:
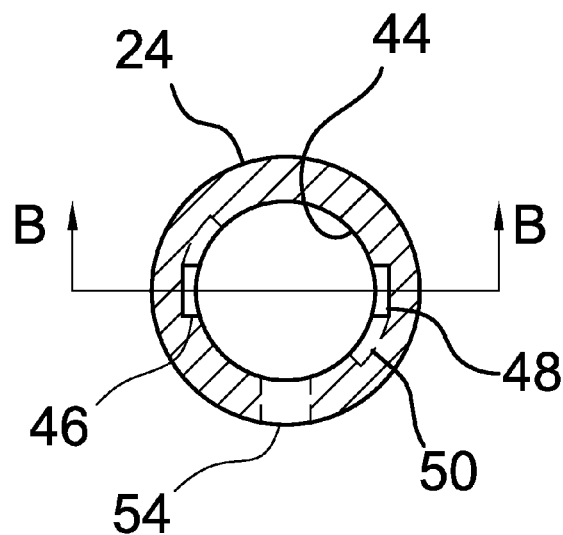
FIGS. 4a and 4b show schematic cross-sectional views of a tube sleeve of a grid nozzle assembly according to an embodiment of the present invention.
Figure 4B:
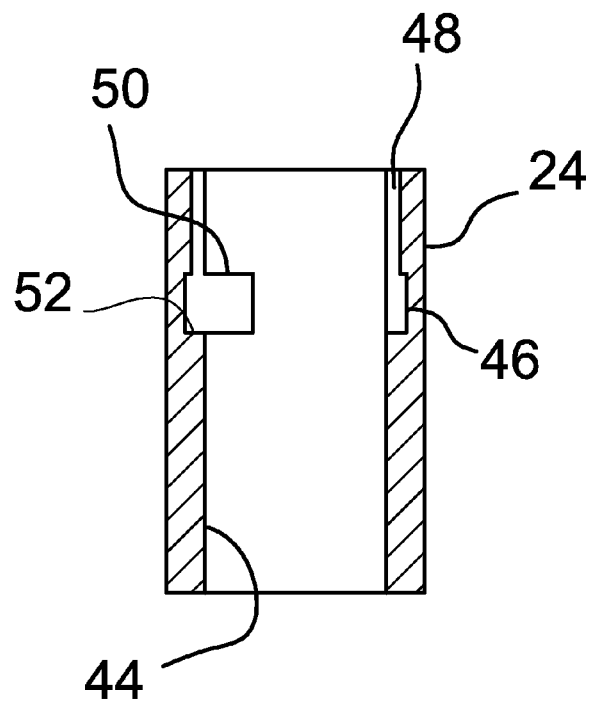

FIG. 4a schematically shows a horizontal cross-sectional view of the tube sleeve 24, and FIG. 4b correspondingly shows a vertical cross section B, as shown in FIG. 4a, of the tube sleeve 24. On the internal surface 44 of the tube sleeve 24 are formed two identical grooves 46 comprising a vertical groove portion 48 and a horizontally extending groove portion 50. The depth of the groove 46 corresponds to the height of the knobs 42, shown in FIG. 3, so that they form a twist-lock to connect the nozzle head 22 with the tube sleeve 24.

The twist-lock is closed by inserting the knobs 42 of the stem into the vertical groove portions 48, sliding the stem 36 downwards in the tube sleeve 24 so far that the knobs 42 reach the lower end 52 of the vertical groove portions 48, and twisting the nozzle head 22 so as to move the knobs 42 in the horizontally extending groove portions 50. Preferably, the horizontal groove portions 50 extend horizontally a predetermined angle, such as about thirty degrees, from the lower end 52 of the vertical groove portion 48. The twist-lock can be secured by tack-welds 32 shown in FIG. 2. The twist-lock is opened by removing the tack welds 32, for example, by grinding, and performing the steps of closing in a reversed order.

In FIGS. 4a and 4b, the internal surface 44 of the tube sleeve 24 comprises two grooves 46, arranged opposite to each other, and the outer surface of the stem 36 correspondingly comprises two knobs 42 fitting in the grooves 46, but the number of grooves 46 and knobs 42 can alternatively be one, or even more than two.

The horizontally extending groove portions 50 are, in FIGS. 2 and 4b, shown as being horizontal, but they are, in practice, advantageously slightly slanted from the vertical groove portion 48 downwards, so as to enable efficient tightening of the lower surface of the top portion 33 of the grid nozzle towards the upper surface of the tube sleeve 24.

FIG. 4a shows one opening 54 in the tube sleeve 24 for forming a plug-weld with a vertical gas pipe in a bottom plate of a fluidized bed reactor 10. The number of openings 54 can, however, alternatively be more than one, for example, two. FIGS. 4a and 4b show a tube sleeve 24 with a cylindrical outer surface, but a portion of the outer surface, for example, a portion of two opposite sides of the tube sleeve 24 may advantageously be made flat, so as to make it easier to hold the tube sleeve 24 in place, while a nozzle head 18 is twisted to remove it from the tube sleeve 24.

While the invention has been described herein by way of examples in connection with what are at present considered to be the most preferred embodiments, it is to be understood that the invention is not limited to the disclosed embodiments, but is intended to cover various combinations or modifications of its features, and several other applications that are included within the scope of the invention as defined in the appended claims.

We claim:

1. A grid nozzle assembly suitable to be mounted in a reaction chamber of a fluidized bed reactor comprising a horizontally extending bottom plate, a gas plenum chamber below the bottom plate, and vertical gas pipes having a top end and extending from the gas plenum chamber upwards across the bottom plate, the grid nozzle assembly comprising:
   a nozzle head with a gas channel for injecting fluidizing gas from one of the vertical gas pipes to the reaction chamber; and
   a tube sleeve adapted to be firmly fixed by welding around the top end of the vertical gas pipe,
   wherein the tube sleeve comprises an upper surface and the nozzle head comprises a horizontally extending top portion and a downwards extending stem adapted to fit into the tube sleeve, so that the horizontally extending top portion is in direct contact with the upper surface of the tube sleeve, and so that the nozzle head and the tube sleeve form a twist-lock enabling quick connecting and disconnecting of the nozzle head and the tube sleeve,
   wherein the tube sleeve also comprises an upper end, a central portion, and an internal surface with at least one groove, the at least one groove comprising a vertical groove portion extending from the upper end of the tube sleeve to the central portion of the tube sleeve and a horizontally extending groove portion in connection with a lower end of the vertical groove portion and extending at a predetermined angle from the vertical portion, and the stem comprises an outer surface with at least one knob fitting in the at least one groove, so as to enable the twist-locking of the nozzle head with the tube sleeve by inserting the knob into the vertical groove portion, sliding the stem downwards in the tube sleeve so far that the knob reaches the lower end of the vertical groove portion, and twisting the nozzle head so as to move the knob in the horizontal groove portion.

2. A grid nozzle assembly according to claim 1, wherein the internal surface of the tube sleeve comprises two or more grooves, each of the grooves comprising a vertical groove portion extending from the upper end of the tube sleeve to the central portion of the tube sleeve and a horizontally extending groove portion extending the predetermined angle from the lower end of the vertical portion, and the outer surface of the stem comprises two or more knobs fitting in the two or more grooves so as to enable the twist-locking of the nozzle head with the tube sleeve.

3. A grid nozzle assembly according to claim 2, wherein the predetermined angle is from about ten degrees to about one hundred sixty degrees.

4. A grid nozzle assembly according to claim 3, wherein the predetermined angle is from about twenty degrees to about ninety degrees.

5. A grid nozzle assembly according to claim 4, wherein the predetermined angle is about thirty degrees.

6. A grid nozzle assembly according to claim 1, wherein the tube sleeve comprises an outer surface and the top portion of the nozzle head comprises a horizontally extending lower surface enabling to secure the twist lock by at least one tack weld between the lower surface of the top portion and the outer surface of the tube sleeve, so that the top portion protects the at least one tack weld by minimizing erosion of the at least one tack weld caused by moving fluidized bed particles.

7. A grid nozzle assembly according to claim 6, wherein the horizontally extending groove portion is slanted from the vertical groove portion downwards so as to enable tightening of the lower surface of the top portion towards the upper surface of the tube sleeve by the twisting of the nozzle head.

8. A grid nozzle assembly according to claim 7, wherein the length of the stem is adapted so that the stem tightens to the vertical gas pipe when the upper surface of the tube sleeve is tightened to the lower surface of the top portion.

9. A grid nozzle assembly according to claim 1, wherein the tube sleeve comprises at least one opening or a contoured lower edge to allow firm fixing of the tube sleeve around the top end of the vertical gas pipe by plug-welding or fillet welding, respectively.

10. A grid nozzle assembly according to claim 1, wherein the tube sleeve comprises an outer surface and the outer surface of the tube sleeve comprises flat surface portions to enable firm holding of the tube sleeve while twisting the nozzle head, so as to prevent damaging the vertical gas pipe.

11. A grid nozzle assembly according to claim 1, wherein the nozzle head is removably connected by at least one tack weld to the tube sleeve so as to allow quick disconnecting of the nozzle head and the tube sleeve.

12. A fluidized bed reactor comprising:
   a horizontally extending bottom plate;
   a gas plenum chamber below the bottom plate;
   multiple vertical gas pipes having a top end extending from the gas plenum chamber upwards across the bottom plate multiple; and
   multiple grid nozzle assemblies according to the grid assembly claim 11,
   wherein the tube sleeves of the grid nozzle assemblies are firmly fixed around the top ends of the vertical gas pipes by welding.

13. A method of mounting a grid nozzle assembly, as a replacement, in a fluidized bed reactor comprising a horizontally extending bottom plate, a gas plenum chamber below the bottom plate, and multiple vertical gas pipes having a top end and extending from the gas plenum chamber upwards across the bottom plate, the method comprising:
   a step of mounting a grid nozzle assembly according to claim 1 in the fluidized bed reactor by firmly fixing the tube sleeve around the top end of one of the vertical gas pipes by welding.

14. A method of replacing a nozzle head of a grid nozzle assembly according to claim 1, mounted in a reaction chamber of a fluidized bed reactor, wherein the method comprises the steps of:
   removing at least one tack weld;
   twisting the nozzle head in the tube sleeve;
   sliding the nozzle head upwards in the tube sleeve, so as to remove the nozzle head from the tube sleeve;
   sliding a new nozzle head downwards in the tube sleeve;
   twisting the new nozzle head in the tube sleeve; and
   securing the new nozzle head to the tube sleeve by at least one tack weld.

* * * * *